United States Patent
Kim et al.

(10) Patent No.: US 9,866,049 B2
(45) Date of Patent: Jan. 9, 2018

(54) BATTERY WARM UP SYSTEM AND METHOD FOR WARMING UP BATTERY USING THE SAME

(71) Applicant: LG CHEM, LTD., Seoul (KR)

(72) Inventors: Sung-Jong Kim, Daejeon (KR);
Joong-Jae Lee, Daejeon (KR);
Soon-Ho Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 150 days.

(21) Appl. No.: 14/558,980

(22) Filed: Dec. 3, 2014

(65) Prior Publication Data

US 2015/0084597 A1 Mar. 26, 2015

Related U.S. Application Data

(63) Continuation of application No. PCT/KR2014/003603, filed on Apr. 24, 2014.

(30) Foreign Application Priority Data

May 8, 2013 (KR) .................. 10-2013-0052096

(51) Int. Cl.
| | |
|---|---|
| *H01M 10/615* | (2014.01) |
| *H02J 7/00* | (2006.01) |
| *B60W 10/26* | (2006.01) |
| *B60L 11/18* | (2006.01) |
| *H01M 10/44* | (2006.01) |

(Continued)

(52) U.S. Cl.
CPC ........... *H02J 7/0063* (2013.01); *B60L 3/12* (2013.01); *B60L 11/1875* (2013.01); *B60W 10/26* (2013.01); *H01M 10/443* (2013.01); *H01M 10/486* (2013.01); *H01M 2010/4271* (2013.01); *H01M 2220/20* (2013.01); *Y02T 10/705* (2013.01); *Y02T 10/7005* (2013.01)

(58) Field of Classification Search
CPC ...................................... H02J 7/0063
USPC .......................................... 320/107
See application file for complete search history.

(56) References Cited

U.S. PATENT DOCUMENTS

| | | |
|---|---|---|
| 5,880,431 A | 3/1999 | Niimi et al. |
| 6,184,656 B1 | 2/2001 | Karunasiri et al. |
| (Continued) | | |

FOREIGN PATENT DOCUMENTS

| | | | | |
|---|---|---|---|---|
| JP | 2006-210244 A | | 8/2006 | |
| JP | 2006210244 A | * | 8/2006 | ............ H02J 7/0063 |
| (Continued) | | | | |

*Primary Examiner* — Drew A Dunn
*Assistant Examiner* — Jerry D Robbins
(74) *Attorney, Agent, or Firm* — Birch, Stewart, Kolasch & Birch, LLP

(57) ABSTRACT

A battery warm up system according to the present disclosure includes an open signal receiving unit to receive a door open signal for opening a door of a vehicle, a temperature measuring unit to measure a temperature of a battery pack connected to a starter of the vehicle, a control unit to output a forced discharging start signal by referring to information associated with the temperature measured by the temperature measuring unit when the door open signal is received by the open signal receiving unit, and a forced discharging circuit unit to force a plurality of battery modules constituting the battery pack to be discharged in response to the forced discharging start signal.

13 Claims, 7 Drawing Sheets

(51) Int. Cl.
  *H01M 10/48* (2006.01)
  *B60L 3/12* (2006.01)
  *H01M 10/42* (2006.01)

(56) References Cited

U.S. PATENT DOCUMENTS

| | | | | |
|---|---|---|---|---|
| 8,704,488 B2* | 4/2014 | Yun | ...................... | H02J 7/0016 320/116 |
| 8,859,119 B2* | 10/2014 | Robertson | ......... | H01M 10/5006 429/50 |
| 8,884,588 B2* | 11/2014 | Aga | .................... | B60L 11/1872 320/104 |
| 9,000,731 B2* | 4/2015 | Biskup | .................. | H01M 10/44 320/135 |
| 2010/0019728 A1 | 1/2010 | Ichikawa et al. | | |
| 2010/0253284 A1* | 10/2010 | Aoki | .................... | H01M 10/441 320/118 |
| 2011/0115435 A1* | 5/2011 | Kikuchi | ............... | B60L 11/1862 320/118 |
| 2012/0094152 A1* | 4/2012 | Wu | ..................... | H01M 10/052 429/50 |
| 2013/0020997 A1* | 1/2013 | Iwasawa | ............. | H01M 10/441 320/116 |
| 2013/0293006 A1* | 11/2013 | Kang | ........................ | H02J 1/10 307/10.1 |
| 2014/0042980 A1* | 2/2014 | Floros | ................... | H02J 7/0016 320/134 |

FOREIGN PATENT DOCUMENTS

| | | |
|---|---|---|
| JP | 2008-117565 A | 5/2008 |
| KR | 1997-0044289 A | 7/1997 |
| KR | 1997-0065103 A | 10/1997 |
| KR | 1020080010698 A | 1/2008 |
| KR | 10-0838306 B1 | 6/2008 |
| KR | 10-0912350 B1 | 8/2009 |
| KR | 10-2011-0040063 A | 4/2011 |
| WO | WO 2013/007326 A1 | 1/2013 |

* cited by examiner

BATTERY WARM UP SYSTEM AND METHOD FOR WARMING UP BATTERY USING THE SAME

CROSS-REFERENCE TO RELATED APPLICATION

The present application is a continuation of International Application No. PCT/KR2014/003603 filed on Apr. 24, 2014, which claims priority to Korean Patent Application No. 10-2013-0052096 filed on May 8, 2013 in the Republic of Korea, the disclosures of which are incorporated herein by reference.

TECHNICAL FIELD

The present disclosure relates to a battery warm up system and a method for warming up a battery using the same, and more particularly, to a system for warming up a battery using heat generation of the battery during discharging and a method for warming up a battery using the same.

BACKGROUND ART

Recently, improvement of energy efficiency and $CO_2$ emissions reduction is a target imposed on the automobile industries. In this context, automobile manufacturers are making continuous attempts to improve energy efficiency by using a lithium ion secondary battery having higher output and higher charging efficiency than a conventional lead storage battery.

However, a lithium ion secondary battery has a drawback that output characteristics drastically degrade when temperature drops down to a predetermined level, and this drawback of the lithium ion secondary battery is a problem that needs to be overcome to enhance cold startability of a vehicle.

DISCLOSURE

Technical Problem

The present disclosure is designed to solve the above problem, and therefore the present disclosure is directed to improving cold startability of a vehicle significantly using heat generation of a battery itself while not causing a great change to an existing power supply system for vehicles.

Rather, the object of the present disclosure is not limited to the above, and the other objects will be better understood by those having ordinary skill in the art from the following detailed description.

Technical Solution

To achieve the above object, a battery warm up system according to an exemplary embodiment of the present disclosure includes an open signal receiving unit to receive a door open signal for opening a door of a vehicle, a temperature measuring unit to measure a temperature of a battery pack connected to a starter of the vehicle, a control unit to output a forced discharging start signal by referring to information associated with the temperature measured by the temperature measuring unit when the door open signal is received by the open signal receiving unit, and a forced discharging circuit unit to force a plurality of battery modules constituting the battery pack to be discharged in response to the forced discharging start signal.

The control unit may output the discharging start signal when the measured temperature of the battery pack is lower than a first reference temperature.

The control unit may output a forced discharging end signal when the temperature of the battery pack reaches a second reference temperature or a discharge amount reaches a set reference discharge amount by the forced discharging.

The forced discharging circuit unit may include a forced discharging switch connected between both ends of the battery module to perform a switch ON/OFF operation in response to the forced discharging start signal and the forced discharging end signal.

The forced discharging circuit unit may force, in response to the forced discharging start signal, the plurality of battery modules to be discharged simultaneously or sequentially in a set order.

Further, to achieve the above object, a battery warm up system according to another exemplary embodiment includes an open signal receiving unit to receive a door open signal for opening a door of a vehicle, a temperature measuring unit to measure a temperature of a battery pack connected to a starter of the vehicle, a battery state measuring unit to measure a state of charge (SOC) of each of a plurality of battery modules constituting the battery pack, a control unit to output a forced discharging start signal by referring to information associated with the temperature measured by the temperature measuring unit when the door open signal is received by the open signal receiving unit, and output a balancing start signal by referring to the SOC of each of the plurality of battery modules, a forced discharging circuit unit to force a certain battery module among the plurality of battery modules to be discharged in response to the forced discharging start signal, and a balancing unit to balance the SOC of each battery module in response to the balancing start signal.

The control unit may output the discharging start signal when the measured temperature of the battery pack is lower than a first reference temperature.

The control unit may output a forced discharging end signal when the temperature of the battery pack reaches a second reference temperature or a discharge amount reaches a set reference discharge amount by the forced discharging.

The forced discharging circuit unit may include a forced discharging switch connected between both ends of a certain battery module among the battery modules to perform a switch ON/OFF operation in response to the forced discharging start signal and the forced discharging end signal.

The forced discharging circuit unit may force, in response to the forced discharging start signal, a certain battery module(s) among the plurality of battery modules to be discharged simultaneously or sequentially in a set order.

The battery state measuring unit may include a voltage sensor to measure a voltage of the battery module.

The battery state measuring unit may further include an SOC calculating unit to calculate an SOC of the battery module using information including a voltage value sensed by the voltage sensor.

The control unit may calculate an SOC of the battery module using information including a voltage value sensed by the voltage sensor.

The balancing unit may balance the SOC by forcing a remaining battery module to be discharged except the forcibly discharged certain battery module.

Meanwhile, to achieve the above object, a power supply system for vehicles according to the present disclosure includes the battery warm up system and a battery pack connected to the battery warm up system.

Also, to achieve the above object, a vehicle according to the present disclosure includes the power supply system for vehicles and a starter to receive power needed for start-up from the battery pack.

The above object may be also achieved by a method for warming up a battery according to the present disclosure, and the method for warming up a battery according to the present disclosure includes determining whether a door open signal for opening a door of a vehicle is received, comparing a temperature of a battery pack to a set first reference temperature, and outputting a forced discharging start signal when the door open signal is received and the temperature of the battery pack is lower than the first reference temperature.

The method for warming up a battery may further include outputting a forced discharging end signal when the temperature of the battery pack reaches a second reference temperature or a discharge amount of a battery module constituting the battery pack reaches a set reference discharge amount in response to the output of the forced discharging start signal.

The method for warming up a battery may further include outputting a balancing start signal when an SOC between a plurality of battery modules constituting the battery pack becomes ununiform due to discharging of a certain battery module among the plurality of battery modules in response to the output of the balancing start signal.

Advantageous Effects

According to one aspect of the present disclosure, cold startability of a vehicle may be significantly improved using heat generation of a battery pack itself while not causing a great change to an existing power supply system for vehicles.

According to another aspect of the present disclosure, a vehicle user may select a time to warm up a battery pack, thereby allowing for efficient warm up without unnecessary consumption of the battery pack.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

A battery warm up system 10 according to an exemplary embodiment of the present disclosure will be described with reference to FIGS. 1 through 4.

Figure 1:
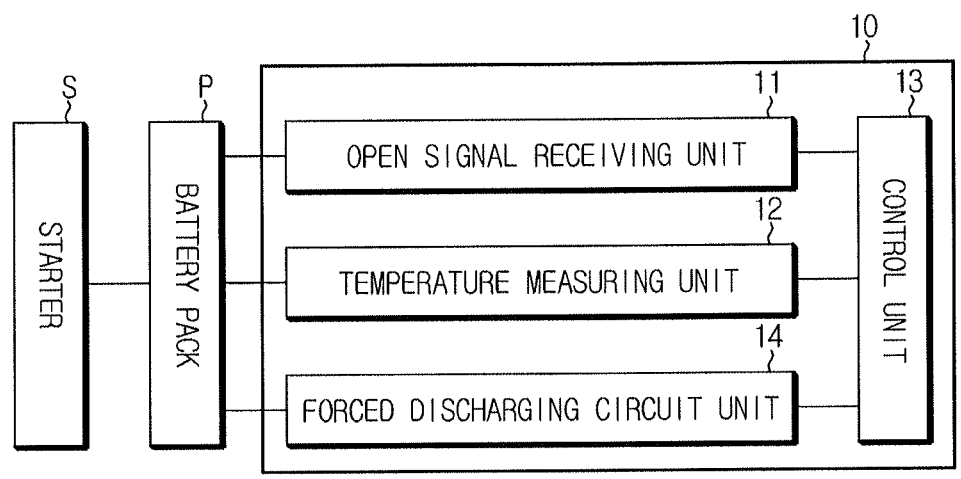
FIG. 1 is a block diagram illustrating a battery warm up system according to an exemplary embodiment of the present disclosure.
Figure 2:
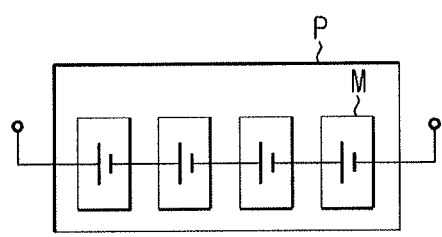
FIG. 2 is a diagram illustrating a battery pack connected to a battery warm up system according to an exemplary embodiment of the present disclosure.
Figure 3:
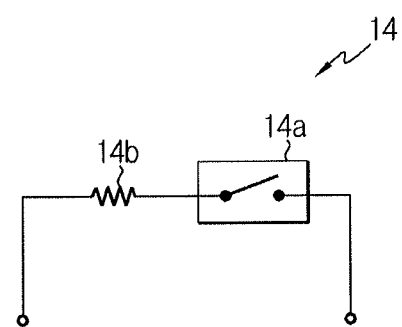
FIG. 3 is a diagram illustrating a forced discharging circuit unit employed in a battery warm up system according to an exemplary embodiment of the present disclosure.
Figure 4:
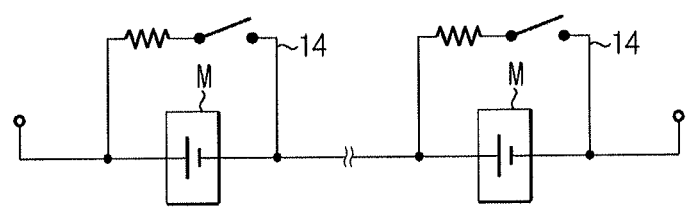
FIG. 4 is a diagram illustrating a combination of a battery pack and a forced discharging circuit unit employed in a battery warm up system according to an exemplary embodiment of the present disclosure.

FIG. 1 is a block diagram illustrating a battery warm up system according to an exemplary embodiment of the present disclosure, and FIG. 2 is a diagram illustrating a battery pack connected to the battery warm up system according to an exemplary embodiment of the present disclosure. Also, FIG. 3 is a diagram illustrating a forced discharging circuit unit employed in the battery warm up system according to an exemplary embodiment of the present disclosure, and FIG. 4 is a diagram illustrating a combination of the battery pack and the forced discharging circuit unit employed in the battery warm up system according to an exemplary embodiment of the present disclosure.

First, referring to FIG. 1, the battery warm up system 10 according to an exemplary embodiment of the present disclosure includes an open signal receiving unit 11, a temperature measuring unit 12, a control unit 13, a forced discharging circuit unit 14.

The open signal receiving unit 11 corresponds to a receiving module which receives a door open signal for opening a door of a vehicle.

The door open signal may be emitted, for example, by pressing down a door open button on a remote controller possessed by a user of the vehicle, or by pressing down a door open button installed on a door handle of the vehicle and the like. However, it is obvious that a method of emitting the door open signal may change based on a door open/close method applied to the vehicle.

Meanwhile, it should be understood that the door open signal does not represent only a final signal for opening the vehicle door, and represents various signals related to operation of the vehicle performed before the user gets in the vehicle. For example, when the user approaches the vehicle, a preliminary signal prior to opening the door such as an initiation signal of a welcome function for operating a headlight or a side view mirror of the vehicle may be included in the door open signal of the present disclosure.

When the door open signal is emitted, the open signal receiving unit 11 receives the door open signal and transmits it to the control unit 13, and in this case, the control unit 13 determines whether to warm up a battery by referring to a temperature of a battery pack P.

The temperature measuring unit 12 measures the temperature of the battery pack P connected to a starter S of the vehicle, and is attached to a specific position of the battery pack P to sense a temperature. This temperature sensing is performed to determine a warm up start time for the battery pack P by monitoring the temperature of the battery pack P made up of lithium ion secondary batteries of which output characteristics degrade when the temperature drops down to a predetermined level (for example, lower than 0° C.).

Meanwhile, the battery pack P may be implemented, for example, by connecting a plurality of battery modules M (see FIG. 2) in series, each battery module including a plurality of lithium ion secondary battery cells (not shown) connected in parallel.

Information associated with the temperature sensed by the temperature measuring unit 12 is transmitted to the control unit 13, and may be used as a material for calculating a state of charge (SOC) of the battery pack P as well as a material for determining whether to operate the forced discharging circuit unit 14.

When the door open signal is received through the open signal receiving unit 11, the control unit 13 outputs a forced discharging start signal by referring to the information associated with the temperature of the battery pack P, to warm up the battery pack P.

Specifically, when the temperature of the battery pack P measured through the temperature measuring unit 12 is lower than a set first reference temperature, the control unit 13 outputs a forced discharging start signal to warm up the battery pack P.

The forced discharging start signal induces the battery pack P to generate heat through discharging for each battery module M, to warm up the battery pack P.

Also, after the battery pack P is warmed up for a predetermined time, the control unit 13 outputs a forced discharging end signal to terminate the forced discharging of the battery pack P, and a time to output the forced discharging end signal, that is, a time to terminate the battery warm up may be determined in various manners.

For example, in the process of forced discharging, when the temperature of the battery pack P increases and reaches a set second reference temperature (set to be a higher value than the first reference temperature), the control unit 13 may be set to output a forced discharging end signal. As another example, when a discharge amount of the battery module M reaches a set reference discharge amount, the control unit 13 may be set to output a forced discharging end signal.

Meanwhile, the discharge amount may be measured by various methods, for example, Ampere counting. When a discharge amount is calculated by an Ampere counting method, a current sensor (not shown) may be installed on the forced discharging circuit unit 14 to sense a discharging current. In this case, the control unit 13 may calculate a discharge amount by collecting information associated with a discharging current value sensed by the current sensor and integrating it for a predetermined area.

Referring to FIGS. 3 and 4, the forced discharging circuit unit 14 is connected to each battery module M, and includes a forced discharging switch 14a connected between both ends of the battery module M. Also, the forced discharging circuit unit 14 may further include a discharge resistor 14b to prevent an overcurrent from flowing on a discharging circuit during forced discharging.

The forced discharging switch 14a allows the battery module M to be discharged by performing a switch ON operation in response to the forced discharging start signal outputted from the control unit 13, and in response to the forced discharging end signal, stops the forced discharging by performing a switch OFF operation.

Meanwhile, the forced discharging may be performed simultaneously for each of the plurality of battery modules M, and may be performed sequentially in a preset order. That is, if discharging takes place in an equal amount for all the battery modules M, warm up of the battery pack P may be made irrespective of an order in which discharging is performed.

As described in the foregoing, when the temperature of the battery pack P drops down to a predetermined limit and startability of the vehicle is not ensured, the battery warm up system 10 according to an exemplary embodiment of the present disclosure allows the battery pack P to be warmed up. Accordingly, a power supply system for vehicles implemented by combining the battery warm up system 10 and the battery pack P may supply sufficient power to the starter S of the vehicle through warm up achieved using heat generation of the battery pack P itself, hence the vehicle may ensure excellent cold startability.

Furthermore, the battery warm up system 10 according to an exemplary embodiment of the present disclosure enables a vehicle user to select a time to warm up, thereby achieving efficient warm up. That is, when the battery pack P is set to perform a warm up operation all the time, the problem with an SOC reduction may occur, but according to construction of the battery warm up system 10 according to an exemplary embodiment of the present disclosure, warm up may start from the moment a user opens a door to ride a vehicle, thereby achieving efficient warm up without unnecessary power consumption.

Subsequently, a battery warm up system 20 according to another exemplary embodiment of the present disclosure is described with reference to FIGS. 5 and 6.

Figure 5:
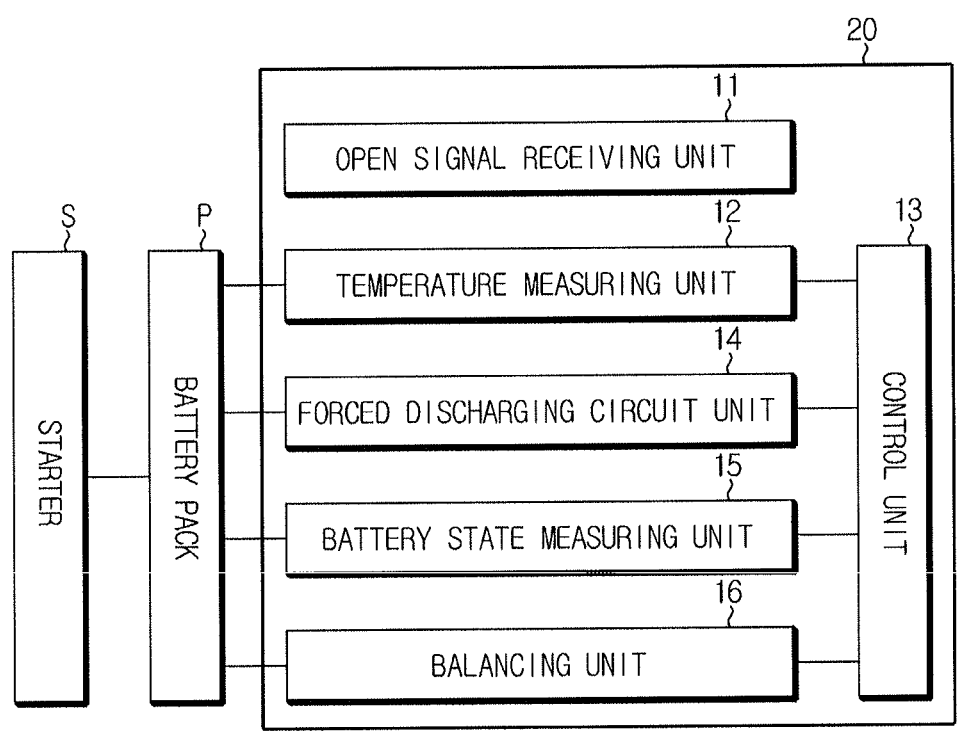
FIG. 5 is a block diagram illustrating a battery warm up system according to another exemplary embodiment of the present disclosure.
Figure 6:
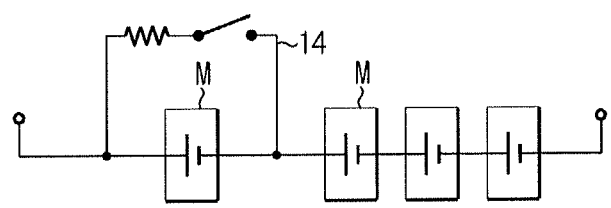
FIG. 6 is a diagram illustrating a combination of a battery pack and a forced discharging circuit unit employed in a battery warm up system according to another exemplary embodiment of the present disclosure.

FIG. 5 is a block diagram illustrating a battery warm up system according to another exemplary embodiment of the present disclosure, and FIG. 6 is a diagram illustrating a combination of a battery pack and a forced discharging circuit unit employed in the battery warm up system according to another exemplary embodiment of the present disclosure.

Referring to FIGS. 5 and 6, the battery warm up system 20 according to another exemplary embodiment of the present disclosure differs from the battery warm up system according to the previous embodiment in the function of the control unit 13 and the connection structure between the forced discharging circuit unit 14 and the battery pack P, and in that the battery warm up system 20 further includes a battery state measuring unit 15 and a balancing unit 16.

Accordingly, in the description of the battery warm up system 20 according to another exemplary embodiment of the present disclosure, a description of different items from the previous embodiment is only provided and an overlapping description with the previous embodiment is omitted herein.

Referring to FIG. 6, in the battery warm up system 20 according to another exemplary embodiment of the present disclosure, the forced discharging circuit unit 14 is connected to only a certain battery module M among a plurality of battery modules M constituting a battery pack P. Although the drawing of the present disclosure only shows that the forced discharging circuit unit 14 is connected to one battery module M, the present disclosure is not limited thereto.

The battery module M connected to the forced discharging circuit unit 14 is discharged to a predetermined amount in response to a forced discharging start signal and a forced discharging end signal of the control unit 13, but the remaining battery module M is not discharged, as a result, an SOC difference occurs between the battery modules M.

When the SOC difference increases and reaches a set first reference amount, the control unit 13 outputs a balancing start signal, and in response to the balancing start signal, the balancing unit 16 performs a balancing operation to make the SOC uniform. The balancing operation may be performed through discharging of the remaining battery module M except the battery module M connected to the forced discharging circuit unit 14 and already discharged to a predetermined amount. That is, the balancing unit 16 may correspond to a discharging circuit having similar construction to the forced discharging circuit unit 14 previously described.

Also, in the process of balancing, when the SOC difference between the battery modules M reaches a set second reference amount, the control unit 13 outputs a balancing end signal, and in response to the balancing end signal, the balancing unit 16 stops the balancing operation.

The SOC difference between the battery modules M may be calculated using the information associated with the SOC collected through the battery state measuring unit 15. That is, the battery state measuring unit 15 measures an SOC of each battery module M, and may include a voltage sensor (not shown) to measure a voltage of each battery module M.

Information associated with a voltage value across both ends of each battery module M measured through the voltage sensor is transmitted to the control unit 13, and may be used as a material for calculating an SOC of the battery module M. Also, to the contrary, the battery state measuring unit 15 may include an SOC calculating unit (not shown) to calculate an SOC of the battery module M directly using the information associated with the voltage value measured through the voltage sensor. Also, to obtain a more accurate value when calculating the SOC, the information associated with the temperature of the battery pack P measured through the temperature measuring unit 12 may be additionally used.

As described in the foregoing, when a warm up condition for the battery pack P is satisfied, the battery warm up system 20 according to another exemplary embodiment of the present disclosure preferentially performs forced discharging for a certain battery module M, and subsequently, performs balancing for the battery pack P, so that the entire battery pack P may be warmed up.

Subsequently, a method for warming up a battery according to an exemplary embodiment of the present disclosure is described with reference to FIG. 7.

Figure 7:
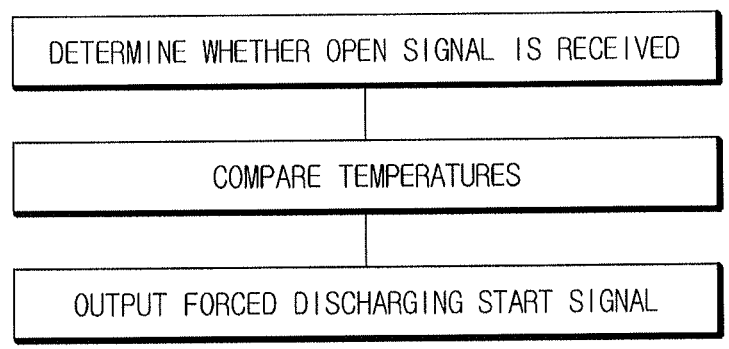
FIG. 7 is a flowchart illustrating a method for warming up a battery according to an exemplary embodiment of the present disclosure.

FIG. 7 is a flowchart illustrating a method for warming up a battery according to an exemplary embodiment of the present disclosure.

Referring to FIG. 7, the method for warming up a battery according to an exemplary embodiment of the present disclosure includes determining whether an open signal is received, comparing temperatures, and outputting a forced discharging start signal.

The determining as to whether an open signal is received is a step of determining whether a door open signal for opening a door of a vehicle has been received through the open signal receiving unit 11.

The comparing of the temperatures is a step of comparing a temperature of a battery pack P measured through the temperature measuring unit 12 to a set first reference temperature.

The outputting of the forced discharging start signal is a step of outputting a signal for causing forced discharging of a battery module M when the door open signal is received through the open signal receiving unit 11 and the measured temperature of the battery pack P is determined to be lower than the set first reference temperature.

Meanwhile, the method for warming up a battery according to an exemplary embodiment of the present disclosure may further include outputting a forced discharging end signal and outputting a balancing start signal.

The outputting of the forced discharging end signal is a step of outputting a signal for stopping the discharging when the warm up is determined to be completed in case in which the temperature of the battery pack P increases and reaches a second reference temperature or a discharge amount of the battery module M reaches a set reference discharge amount in response to the forced discharging start signal being outputted.

The outputting of the balancing start signal is a step of outputting a signal for performing balancing when a SOC difference between a plurality of battery modules M is higher or equal to a predetermined amount due to discharging only for a certain battery module M among the plurality of battery modules M in response to the forced discharging start signal being outputted.

The above-mentioned method for warming up a battery according to an exemplary embodiment of the present disclosure allows the battery pack P to be warmed up, as described in the foregoing, by causing discharging of the battery module M under a predetermined condition, so a vehicle has excellent cold startability.

Meanwhile, in the description of the present disclosure, it should be understood that each element shown in FIG. 1 is distinguished logically rather than physically.

That is, since each element of the present disclosure corresponds to a logical component for realizing the spirit of the present disclosure, even though elements are integrated or divided, if functions are found to be identical or similar, the integrated or divided elements should be construed as falling within the scope of the present disclosure, regardless of the names they are called.

Hereinabove, the present disclosure has been described by specific embodiments and drawings, but the present disclosure is not limited thereto and it should be understood that various changes and modifications may be made by those having ordinary skill in the art within the spirit and scope of the disclosure and the appended claims and their equivalents.

What is claimed is:

1. A battery warm up system, comprising:
an open signal receiving unit to receive a door open signal for opening a door of a vehicle;
a temperature measuring unit to measure a temperature of a battery pack connected to a starter of the vehicle;
a battery state measuring unit to measure a state of charge (SOC) of each of a plurality of battery modules constituting the battery pack;
a control unit to output a forced discharging start signal to create an SOC difference between a plurality of battery modules by referring to information associated with the temperature measured by the temperature measuring unit when the door open signal is received by the open signal receiving unit, and output a balancing start signal by referring to the SOC of each of the plurality of battery modules;
a forced discharging circuit to force at least one battery module but less than all battery modules among the plurality of battery modules to transmit current through a resistor in the forced discharging circuit in response to the forced discharging start signal to create the SOC difference between the plurality of battery modules; and a balancing unit to balance the SOC of each battery module in response to the balancing start signal, wherein the forced discharging circuit consists essentially of a switch and a resistor in parallel with each battery module, the switch being in series with the resistor.

2. The battery warm up system according to claim 1, wherein the control unit outputs the discharging start signal when the measured temperature of the battery pack is lower than a first reference temperature.

3. The battery warm up system according to claim 2, wherein the control unit outputs a forced discharging end signal when the temperature of the battery pack reaches a second reference temperature or a discharge amount reaches a set reference discharge amount by the forced discharging.

4. The battery warm up system according to claim 3, wherein the forced discharging circuit comprises a forced discharging switch connected between both ends of a certain battery module among the battery modules to perform a switch ON/OFF operation in response to the forced discharging start signal and the forced discharging end signal.

5. The battery warm up system according to claim 1, wherein the forced discharging circuit forces, in response to the forced discharging start signal, a certain battery modules among the plurality of battery modules to be discharged simultaneously or sequentially in a set order.

6. The battery warm up system according to claim 1, wherein the battery state measuring unit comprises a voltage sensor to measure a voltage of the battery module.

7. The battery warm up system according to claim 6, wherein the battery state measuring unit further comprises an SOC calculating unit to calculate an SOC of the battery module using information including a voltage value sensed by the voltage sensor.

8. The battery warm up system according to claim 6, wherein the control unit calculates an SOC of the battery module using information including a voltage value sensed by the voltage sensor.

9. The battery warm up system according to claim 1, wherein the balancing unit balances the SOC by forcing a remaining battery module to be discharged except the forcibly discharged certain battery module.

10. A power supply system for vehicles, comprising:
a battery warm up system defined in claim 1; and
a battery pack connected to the battery warm up system.

11. A vehicle comprising:
a power supply system for vehicles defined in claim 10; and
a starter to receive power needed for start-up from the battery pack.

12. A method for warming up a battery, the method comprising:
determining whether a door open signal for opening a door of a vehicle is received;
comparing a temperature of a battery pack to a set first reference temperature;
creating an SOC difference between a plurality of battery modules by outputting a forced discharging start signal when the door open signal is received and the temperature of the battery pack is lower than the first reference temperature by transmitting current from at least one battery module but less than all battery modules among the plurality of battery modules through a resistor in parallel with the at least one battery module in a forced discharging circuit provided for each battery module by closing a switch in series with the resistor;
outputting a balancing start signal when an SOC between the plurality of battery modules constituting the battery pack becomes imbalanced due to discharging of a at least one battery module but less than all battery modules among the plurality of battery modules in response to the output of the balancing start signal.

13. The method for warming up a battery according to claim 12, further comprising:
outputting a forced discharging end signal when the temperature of the battery pack reaches a second reference temperature or a discharge amount of a battery module constituting the battery pack reaches a set reference discharge amount in response to the output of the forced discharging start signal.

* * * * *